United States Patent
Salisbury et al.

(10) Patent No.: US 6,619,627 B2
(45) Date of Patent: Sep. 16, 2003

(54) T-POST FENCE BRACKET

(75) Inventors: Gordon L. Salisbury, North Kingstown, RI (US); Elyes Zhioua, 3 O'Keefe Dr., Woodriver Junction, RI (US) 02894

(73) Assignee: Elyes Zhioua, Wakefield, RI (US)

( * ) Notice: Subject to any disclaimer, the term of this patent is extended or adjusted under 35 U.S.C. 154(b) by 0 days.

(21) Appl. No.: 09/873,049

(22) Filed: Jun. 4, 2001

(65) Prior Publication Data

US 2002/0179893 A1 Dec. 5, 2002

(51) Int. Cl.[7] .............................................. E04H 17/00
(52) U.S. Cl. ............................. 256/1; 256/10; 256/54; 256/47
(58) Field of Search ......................... 256/11, 32–58, 256/DIG. 3, DIG. 5, 1, 10

(56) References Cited

U.S. PATENT DOCUMENTS

| | | | | |
|---|---|---|---|---|
| 984,484 A | * | 2/1911 | Kordzikowski | 256/54 |
| 1,956,757 A | * | 5/1934 | Eckel | 256/1 |
| 2,805,277 A | * | 9/1957 | Moeller | 256/10 X |
| 2,968,850 A | * | 1/1961 | Tinnerman | |
| 3,233,297 A | * | 2/1966 | Havener | |
| 3,531,090 A | * | 9/1970 | Laible | 256/10 |
| 3,562,873 A | * | 2/1971 | Cumber | |
| 3,568,980 A | * | 3/1971 | Hulburt et al. | |
| 3,806,095 A | * | 4/1974 | Ford | 256/11 |
| 3,896,596 A | * | 7/1975 | Berger | 256/47 |
| 3,977,653 A | * | 8/1976 | Fingerson et al. | 256/10 |
| 4,077,611 A | * | 3/1978 | Wilson | 256/47 X |
| 4,333,264 A | * | 6/1982 | Smrt | 256/54 X |
| 4,692,567 A | * | 9/1987 | Crum | 256/10 X |
| 4,834,186 A | * | 5/1989 | Ballard | |
| D310,780 S | * | 9/1990 | Kelley et al. | |
| 4,979,724 A | * | 12/1990 | Williams | 256/36 |
| 5,046,705 A | * | 9/1991 | Williams | 256/36 |
| 5,395,093 A | * | 3/1995 | Chrisman | 256/47 |
| 5,412,158 A | * | 5/1995 | Yearwood | |
| 5,438,795 A | * | 8/1995 | Galbraith | 256/48 |
| 5,439,201 A | * | 8/1995 | Landreville | |
| 5,657,966 A | * | 8/1997 | Cicinnati | |
| 6,247,553 B1 | * | 6/2001 | Jones | |
| 6,394,228 B1 | * | 5/2002 | Stephens et al. | 256/47 X |

* cited by examiner

Primary Examiner—Anthony Knight
Assistant Examiner—Ryan M. Flandro
(74) Attorney, Agent, or Firm—Cristina M Offenberg, Esq.

(57) ABSTRACT

The t-post fence bracket of the present invention provides a simple and effective means of securing a variety of items by use of u-hooks, plates or brackets to a widely used metal t-post without the use of tools. Items such as fence rails, buckets, chains, rope, wire, or solar panels may be attached or hung from the bracket to support it from the ground level. Further, the bracket does not have sharp edges, and hence humans and animals coming into contact with the bracket will not be injured thereby.

8 Claims, 7 Drawing Sheets

T-POST FENCE BRACKET

BACKGROUND OF THE INVENTION

DESCRIPTION

1. Technical Field

The present invention relates generally to a fence bracket and more particularly to a bracket for securing a variety of items on a metal t-post.

2. Background Art

Steel posts having different shapes are often used in fence building as inexpensive and easily installed posts, particularly for temporary fences or to fence in large areas such as fields for animals.

Fences have been designed and constructed wherein horizontal rails are secured to vertical metal fence posts by means of hooks or clasps. For example, Bettis U.S. Pat. No. 57,073 discloses the use of iron hooks which surround a circular metal fence post and which are secured at a desired height on the post by a wedge or key. Overlapping horizontal boards extend through a front portion of the iron hook and are supported thereby.

Landreville U.S. Pat. No. 5,439,201 is a bracket for mounting fence rails and other items to common rolled metal post wherein the bracket is designed to fit and slip over the top of the t-post Smrt U.S. Pat. No. 4,792,122 discloses a fence bracket for mounting adjacent fence rails in fixed relation with first and second fingers engaging the flange of the t-post.

The first two devices described above have various disadvantages. The metallic clasp of Gleason can be installed while wire is fixed on the post. However, the clasp is only capable of use with one type offence post, i.e. those having a recess on one face thereof This type offence post is not in wide use today and hence the Gleason clasp currently has limited usefulness. The Smrt patent is able to be used while the t-post is supporting other fencing, however its use is specific for holding rails and is shaped for that purpose.

There is a need for a t-post fence bracket that can be adjustable to any height and used to hold or secure a variety of materials including buckets, rails, tubs, chains, electronic equipment, solar panels and the like. A bracket that can support a large volume of weight is also needed. The need for a fence bracket as described that can also be used while the post is being used as a post for fencing is useful.

SUMMARY OF THE INVENTION

In accordance with the present invention, a fence bracket is provided for mounting rails, buckets or tubs for feeding or watering animals, other electronic equipment, electric eye or an item that needs to hang from the fence post such as a chain. The fence bracket is designed and adapted to be used on widely used metal fence posts and can be installed even while the post is supporting other fencing apparatus. The bracket is constructed of rigid material and is shaped relatively rectangular and has three plates that are stamped from one piece of rigid material to allow for the bracket to slip over and hang from the top of the post and attach to the post protrusions. The bracket attaches to a fence post having a substantially flat front face having width, and at least one rearwardly projecting protrusion.

More particularly, a first embodiment of the fence bracket of the present invention is particularly adapted for use on T-shaped metal fence posts having a rearward face with a series of protrusions longitudinally spaced along the face. The bracket includes a combination of three plates stamped from one piece of metal or rigid material. For ease of description the bracket is referred to as three plates. The most common means of manufacture is stamping from one piece that is shaped with the ends at an angle. The first plate, the top plate, is stamped to the second plate, a flat back plate, at approximately a 30 degree angle. The flat back plate and a third plate, the bottom plate, are stamped at approximately a 30 degree. A fourth plate may be stamped to the flat back plate. The top plate is formed with a cut out shaped and designed to fit over the top of the t-post. The flat back plate fits flat against the front of the t-post. The bottom plate is designed with a notch at the bottom edge to engage a protrusion of the t-post to limit movement of the bracket on the post.

A plastic tie is used to attach the bottom plate to the t-post rather that the nut and bolt, which may be the most common practice. In a second embodiment, the bottom plate can be adapted with a u-hook to the back side of the plate to be placed around the fence post and used to hold the bracket in place and prevent movement rather than the nut and bolt. Two screw holes are also cut into the bottom plate to further secure the bracket with nuts and bolts. The nut and bolt may be fastened through the t-post and holes of the bottom plate to permanently attach the bracket to the t-post.

The flat back plate is then utilized to attach a variety and unlimited number of items such as sensors, nozzles, solar panels, rings or u-hooks to hold a chain or rope between two t-posts, sections to hold a gate, support a salt block or any other number of uses. One or more fasteners, such as a screw, nut, bolt, may be driven through the flat back plate to securely fasten an object to them. As previously discussed, a fourth plate may be stamped to the flat back plate to attach or hold items.

The design of the bracket will support a large amount of weight in comparison to its size. The bracket when in use, encompasses the support of the upright t-post when supporting the weight of an object. The bracket is removable and portable as it is a lightweight bracket. More than one bracket may be place on one t-post or a series of brackets can be place on a series of t-post to hold a very long item up from the ground such as a rail or hose. The bracket is preferably a unitary member stamped from relatively heavy gauge sheet metal, plastic or other resilient material.

The bracket is easily assembled on the post and in the field. In some instances there is no need to remove the existing fencing apparatus which is already supported by the post in order to use the present invention.

DESCRIPTION OF THE PREFERRED EMBODIMENT

Figure 1:
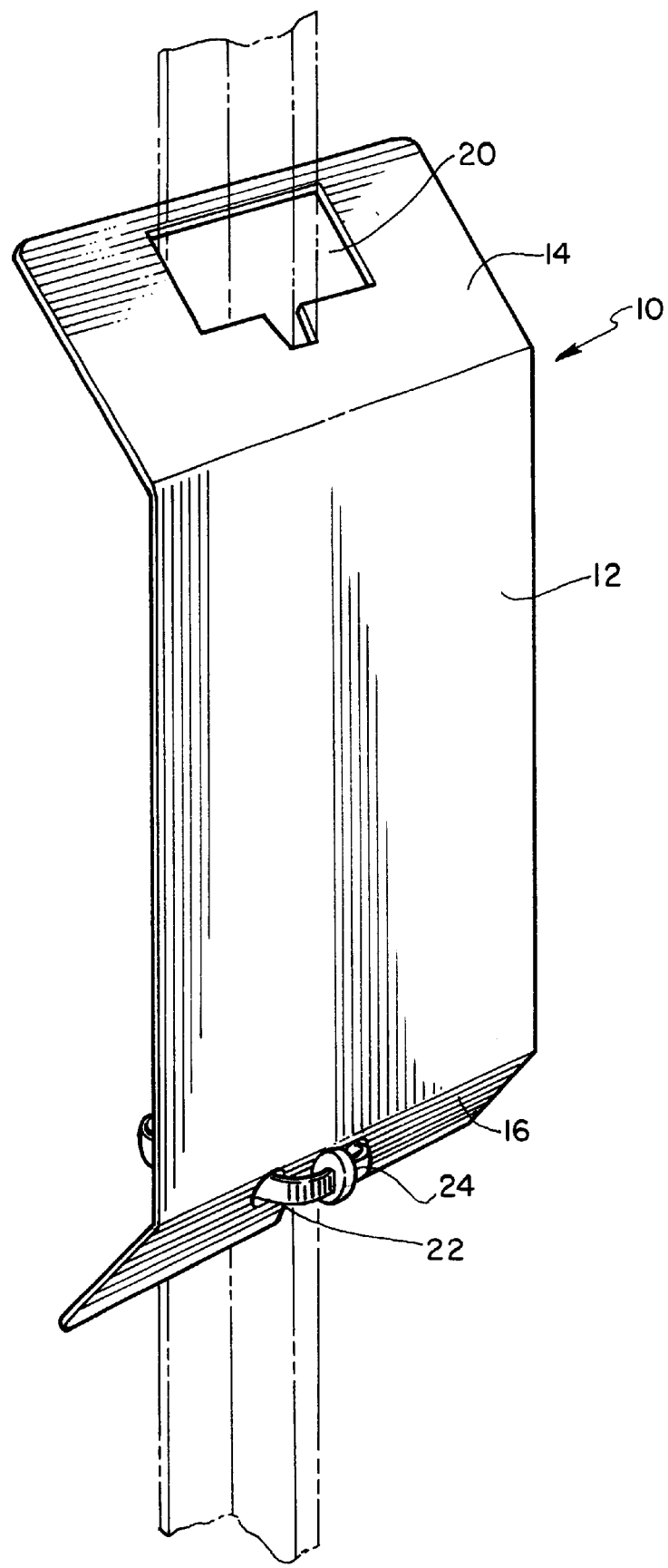
FIG. 1 is a perspective view of the preferred embodiment of the bracket of the present invention for use with T-shaped metal fence posts.

In FIG. 1, the bracket 10 is shown from the front. The bracket shown is particularly adapted for use with T-shaped fence posts. The flat back plate 12 is attached to the top plate 14 at approximately a 30 degree angle. The cut out 20 is designed to fit over the top of a t-post. The bottom plate 16 is also at approximately a 30 degree angle to the flat back plate 12. The design of the top plate 14 and bottom plate 16 allows for the flat back plate 12 to rest against the t-post. There is a notch 22 on the bottom plate 16 to catch onto a protrusion of the t-post and hold the bracket 10 in place. A plastic tie 24 (or a nut and bolt not shown) is used to secure the bracket 10 onto the t-post.

Figure 2:
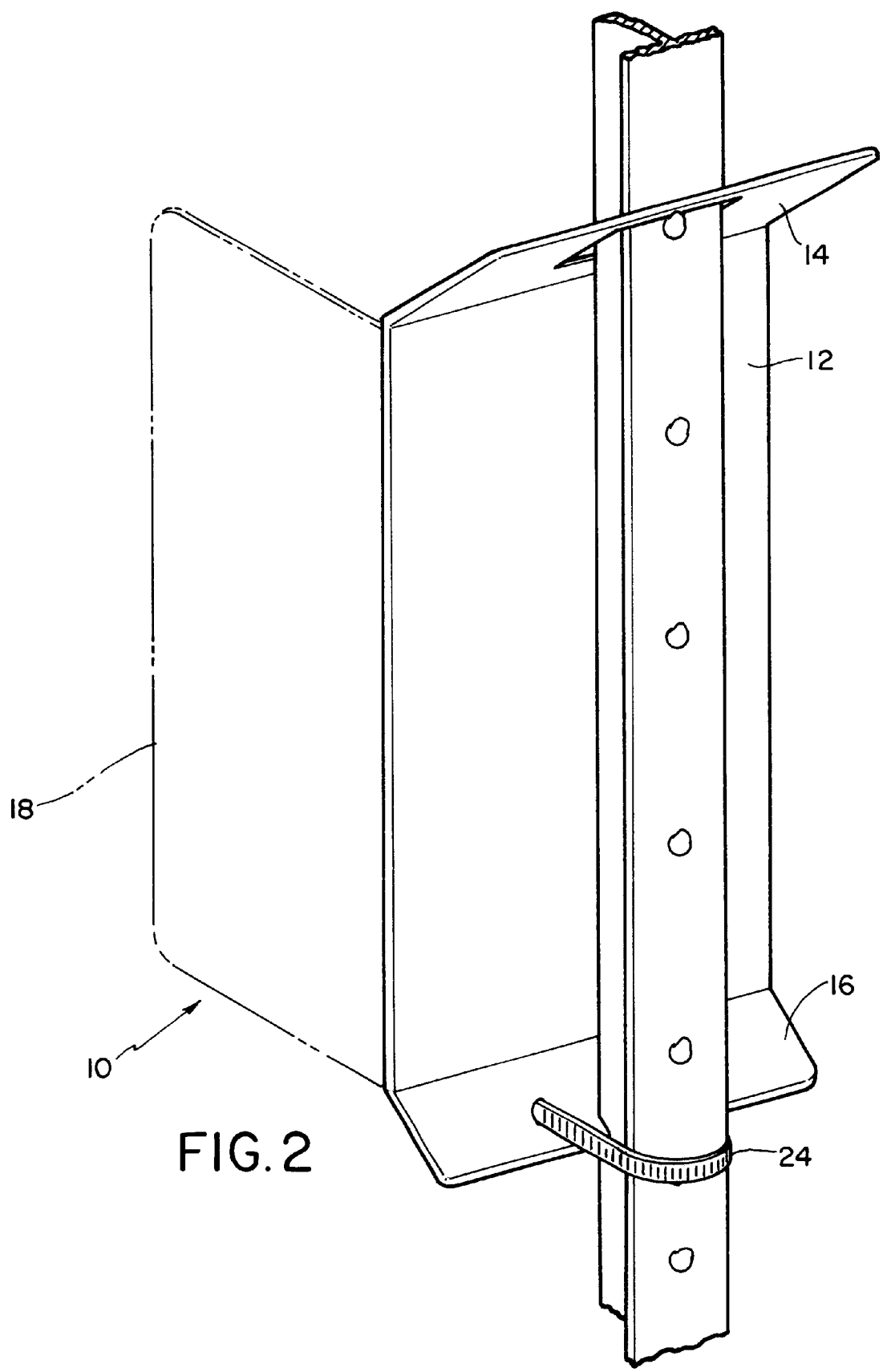
FIG. 2 is a perspective view of the bracket showing the flat back plate with a plastic tie securing the bracket to the post and a fourth plate shown at a ninety degree angle.

FIG. 2 shows the bracket 10 from the back view. The t-post is shown with the bracket 10 secured to the front side of the post. The top plate 14 is fitted over the top of the t-post through the cut out 20. The flat back plate 12 is resting against the length of the t-post. The bottom plate 16 is secured to the t-post by a plastic tie 24. The optional middle plate 18 is shown at approximately a 90 degree angle from the flat back plate 12. The middle plate 18 can be used to secure any type of electronic equipment, buckets, tubs, rails or any unlimited number of items.

Figure 3:
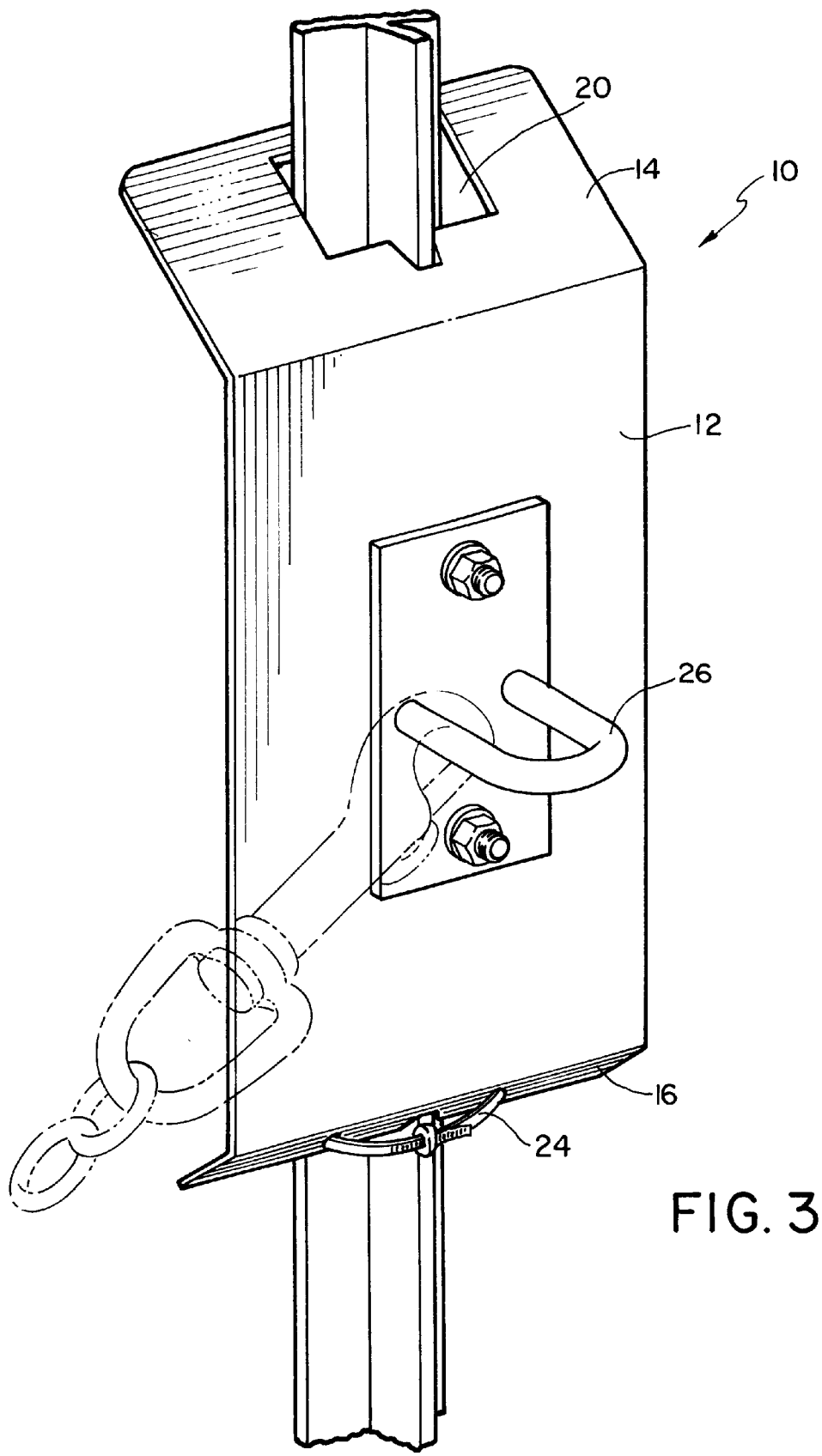
FIG. 3 is a perspective view of showing the bracket adapted with a unhook for attaching a chain.

FIG. 3 is showing a front view of the bracket 10 with a u-shaped hook 26 screwed to the flat back plate 12. This is one way in which the bracket 10 can be utilized. The user can then attach a variety of items to the unshaped hook 26 such as chain or rope. The bracket 10 is able to support a high volume of weight compared to the size of the bracket due to the fact that the bracket 10 is attached to the t-post which is staked into the ground.

Figure 6:
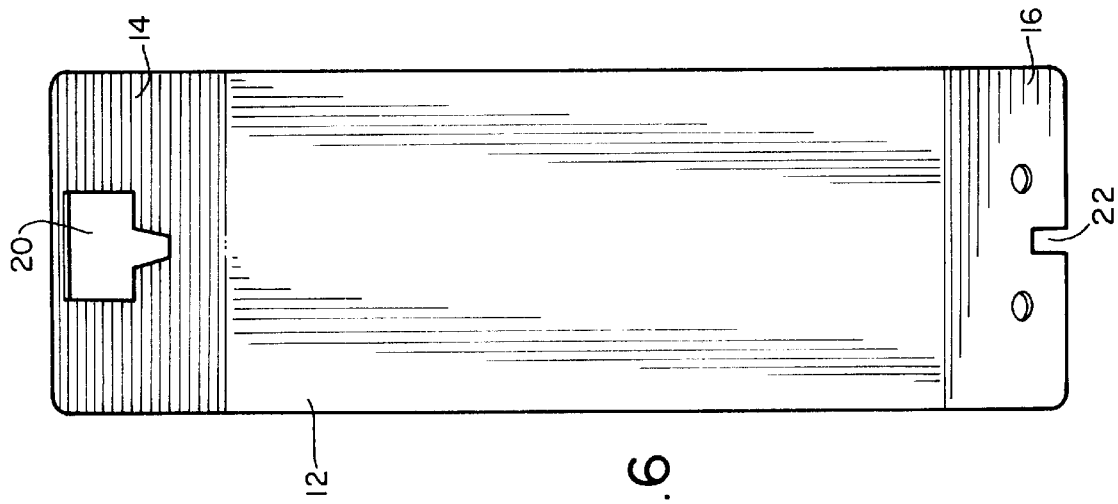
FIG. 6. is a front view of the bracket showing the middle plate angled from the flat back plate.
Figure 5:
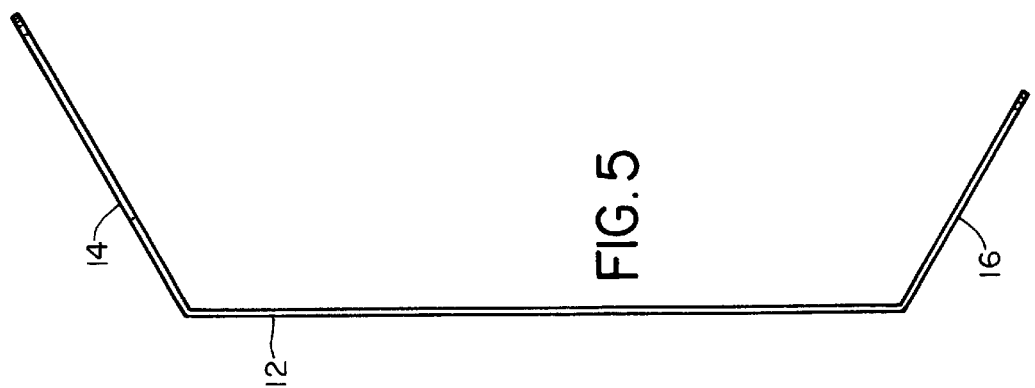
FIG. 5 is a side view of the bracket showing the angle of the top and bottom plates in relation to the middle plate.
Figure 4:
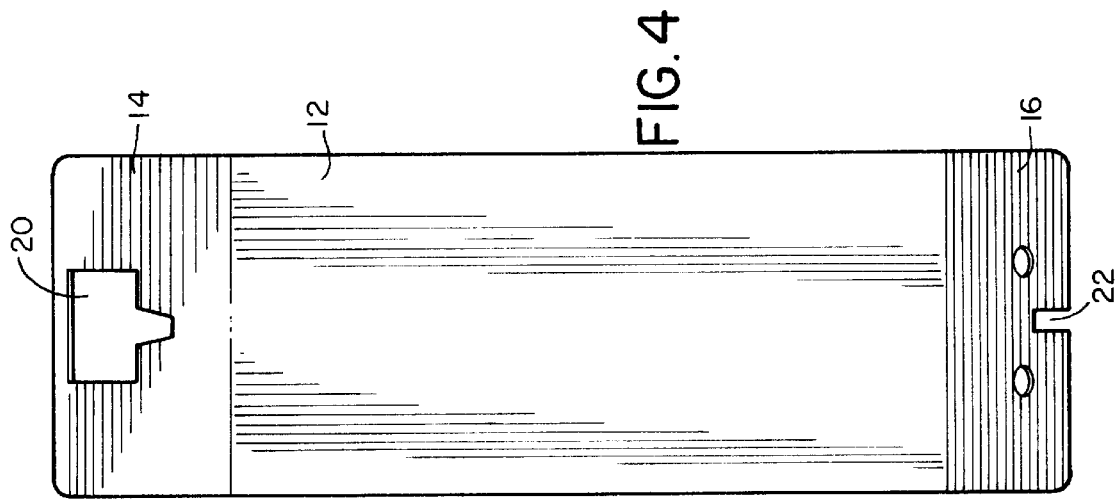
FIG. 4 is a back view of the bracket showing the cut out in the top plate and the notch in the bottom plate and the flat back plate.

FIGS. 4, 5, and 6 shown the bracket when not connected to the t-post. FIG. 4 is a back view of the bracket 10 showing the top plate 14 and bottom plate 16 relative to the flat back plate 12. The cut out 20 is shown cut out of the top plate 14. The notch 22 is shown cut out of the bottom plate 16. FIG. 5 shows a side view of the bracket 10 with the top plate 14 and bottom plate 16 shown at the 30 degree angle from the flat back plate 12. FIG. 6 shows the front view of the bracket 10 with the top plate 14 and bottom plate 16 relative to the flat back plate 12.

Figure 9:
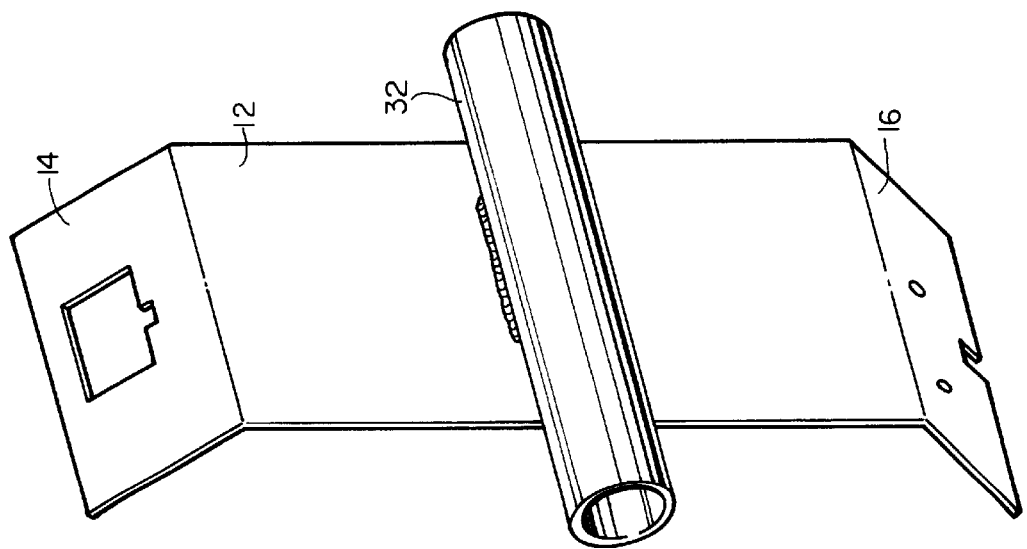
FIG. 9. is a perspective view of another embodiment showing a horizontal tube attached to the flat back plate.
Figure 7:
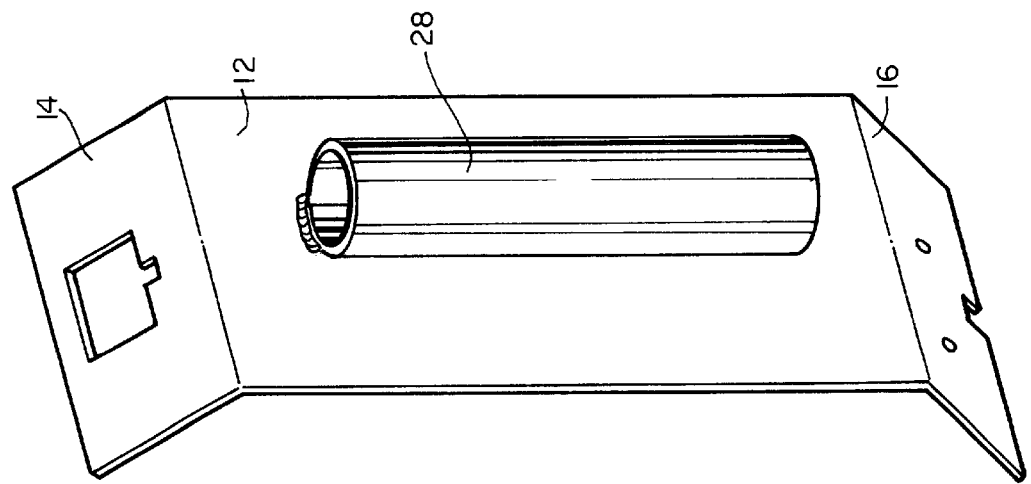
FIG. 7. is a perspective view of another embodiment showing a vertical tube attached to the flat back plate.

FIGS. 7 and 9 show other embodiments in which tubes mounted vertically or horizontally are used for holding wire, hose, rope or the like. When the t-post are set up in a row having these type of brackets secured thereto, a wire, hose, or rope can be strung through the tubes from the first one to the next one and secure the wire, hose or rope off the ground.

Figure 8:
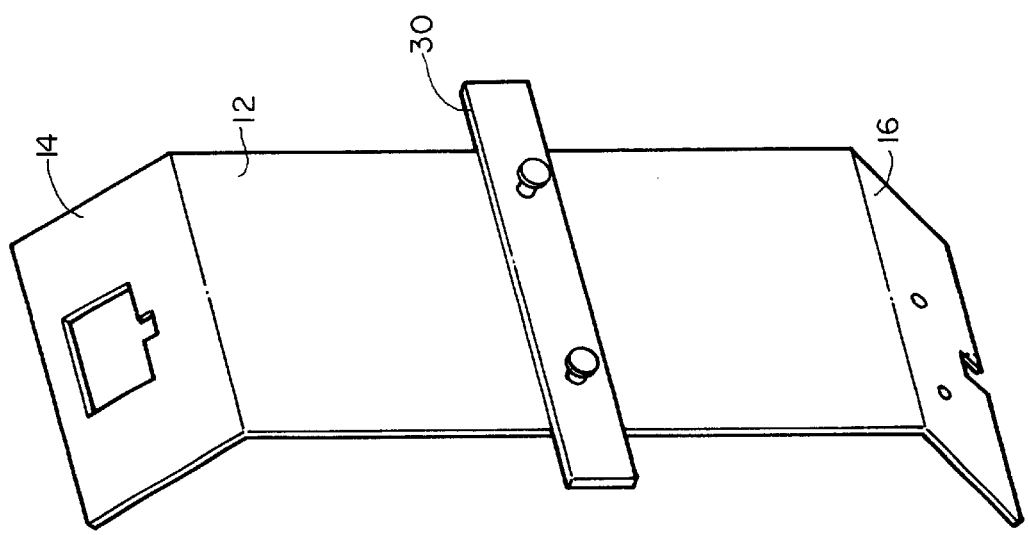
FIG. 8. is a perspective view of another embodiment showing pins attached to a horizontal length of rigid material attached to the flat back plate.

FIG. 8 illustrates a horizontal length of rigid metal hanging pins to which another bracket or the Eke may be attached. It may be desirable to attach another bracket or a piece of rigid material to the bracket of the subject invention to hold a fence post or bucket off the ground. This embodiment can serve that purpose.

Figure 10:
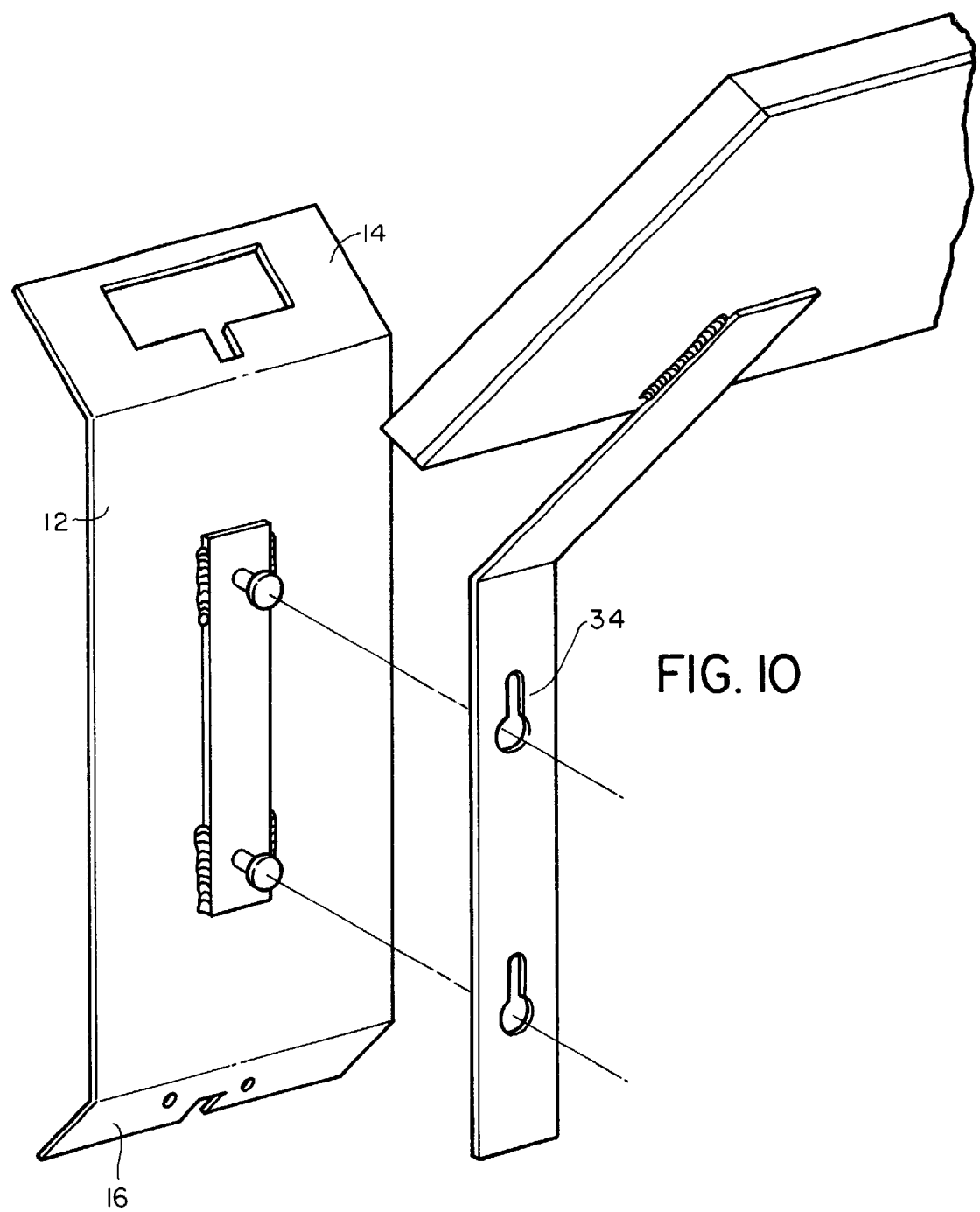
FIG. 10. is a view of another bracket to be mounted to the flat back plate.

FIG. 10 shows the attachment of another bracket by means of pins fitted into slide holes on the second bracket. This second bracket can house a variety of items at a different angle in relation to the t-post, such as a solar panel.

Figure 11:
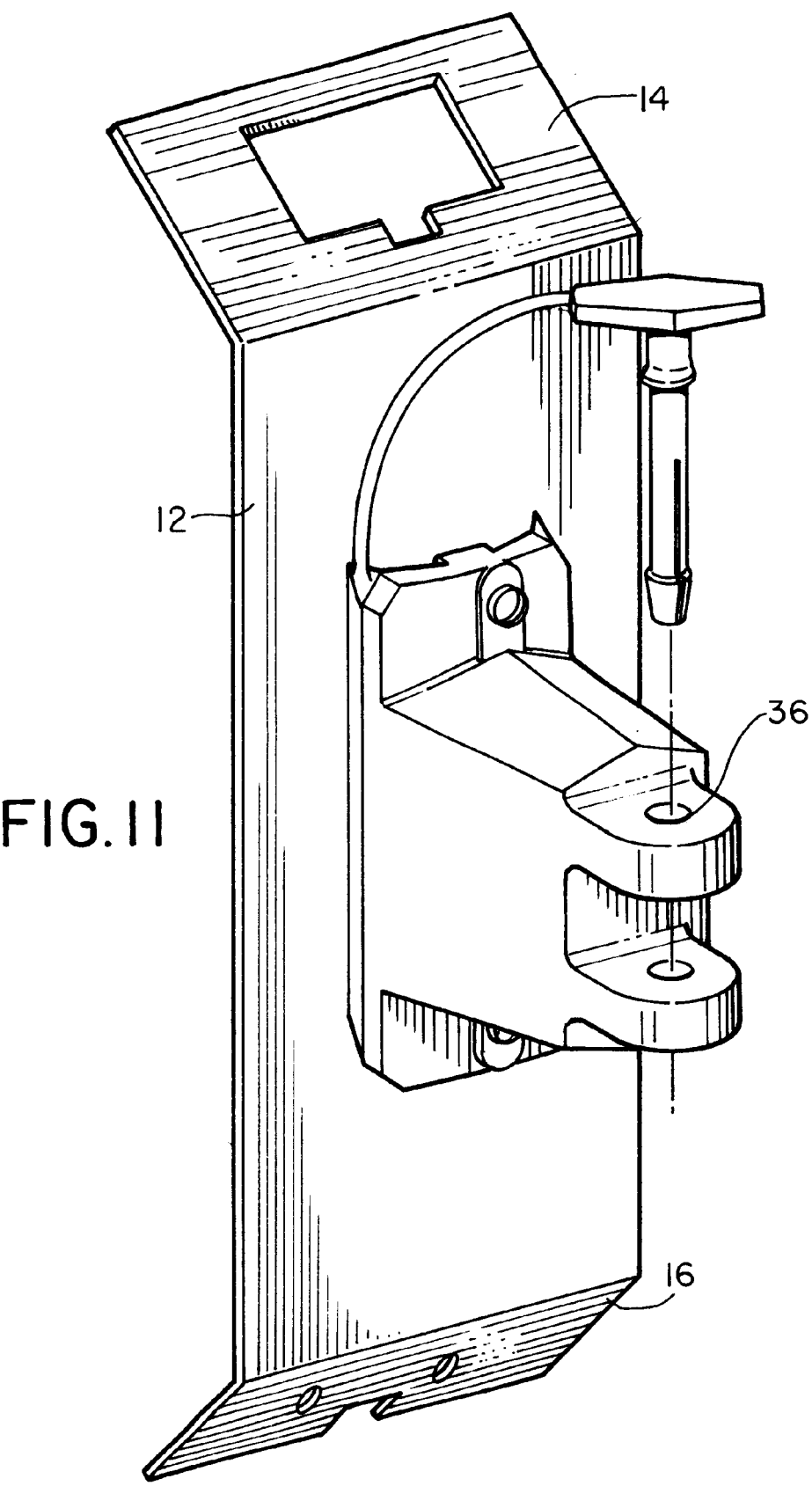
FIG. 11. is a perspective view of a electric wire clamp attached to the flat back plate.

FIG. 11 shows the mounting of an electric fence insulator used with t-post electric wire fencing. It is desirable to have an electric wire running from t-post to t-post to contain animals in an enclosure. The electric wire must not come into contact with the metal post. This embodiment, allows the insulator to hold the electric wire without coming into contact with the bracket or t-post.

We claim:

1. A rigid fence bracket for mounting objects of a variety of weights in a fixed relation on a generally upright fence post of the type having protrusions longitudinally spaced along the post, where the post includes a longitudinal axis and a flange disposed on one side of the longitudinal axis, comprising:

a combination of a relatively flat, a relatively square and rigid first top plate having a top edge, a bottom edge, and two side edges, a relatively flat, a relatively rectangular and rigid second back plate having a top edge, a bottom edge, and two side edges, and a relatively flat, relatively square and rigid third bottom plate having a top edge, a bottom edge and two side edges stamped from one piece of rigid material wherein the first top plate is attached at the bottom edge to the top edge of the second back plate and positioned at an angle to the second back plate;

the third bottom plate is attached at the top edge to the bottom edge of the second back plate and positioned at an angle to the second back plate;

said first top plate is formed with a designed aperture to accept the top of a t-post through the aperture so that the fence bracket hangs from the t-post and the second back plate lies parallel to the t-post;

and said third bottom plate is formed with a notch at the bottom edge to engage a protrusion of the t-post to hold and fasten the fence bracket to the t-post in a tight, non-movable position.

2. A fence bracket as claimed in claim 1 wherein the first top plate is positioned at approximately a thirty degree angle to the top edge of the second back plate and the third bottom plate is positioned at approximately a thirty degree angle to the bottom edge of the second back plate.

3. A fence bracket as claimed in claim 1 further comprising a stamped fourth middle plate having a relatively rectangular shape with a top edge, bottom edge and two side edges positioned at a right angle to the second back plate wherein one of the side edges of the fourth middle plate is attached to one of the side edges of the second back plate forming an L shape.

4. A fence bracket as claimed in claim 1 further comprising two holes in said third bottom plate, one on each side of the notch, for use with a fastener to secure said bracket to said t-post.

5. A fence bracket as claimed in claim 1 further comprising a wire or plastic tie tied to the third bottom plate and the t-post to further secure the bracket to the t-post.

6. A fence bracket is claimed in claim 1 further comprising a horizontal length of rigid material having pins protruding therefrom secured to said second back plate for holding a second bracket having slide holes.

7. A fence bracket as claimed in claim 1 further comprising a horizontal or vertical tube secured to said second back plate adapted to hold a hose, rope, or wire.

8. A fence bracket as claimed in claim 1 further comprising an electric wire clamp secured to said second back plate for holding electric wire.

* * * * *